United States Patent [19]
Porter

[11] Patent Number: 4,607,991
[45] Date of Patent: Aug. 26, 1986

[54] TIE-DOWN ANCHOR FOR TRUCK BED

[76] Inventor: David R. Porter, 827 E. Fountain, Mesa, Ariz. 85203

[21] Appl. No.: 647,688

[22] Filed: Sep. 6, 1984

[51] Int. Cl.⁴ .............................................. B60R 9/00
[52] U.S. Cl. .................................... 410/110; 410/116; 296/43; 403/252; 248/503; 248/231.9; 267/169
[58] Field of Search ............... 410/101, 106, 108, 109, 410/110, 112, 113, 116, 96, 102, 107, 111; 248/503, 499, 231.9; 403/252, 247; 267/169; 296/43

[56] References Cited

U.S. PATENT DOCUMENTS

| 786,961 | 5/1904 | Drakes | 296/43 X |
| 2,231,153 | 1/1948 | Camiener | 248/231.9 X |
| 3,198,466 | 8/1965 | Gardner et al. | 248/503 X |
| 4,297,963 | 11/1981 | Beacom | 410/116 X |
| 4,531,774 | 7/1985 | Whatley | 248/499 X |

FOREIGN PATENT DOCUMENTS 715935 4/1931 France ................................. 296/43

Primary Examiner—Robert B. Reeves
Assistant Examiner—Glenn B. Foster
Attorney, Agent, or Firm—Warren F. B. Lindsley

[57] ABSTRACT

A self-latching tie-down or bolt-down anchor for use in securing loads to open truck beds. The anchor is intended for installation in the cavity commonly provided in the bed or side wall of a pickup truck to receive the lower end of the support post of a rack.

3 Claims, 6 Drawing Figures

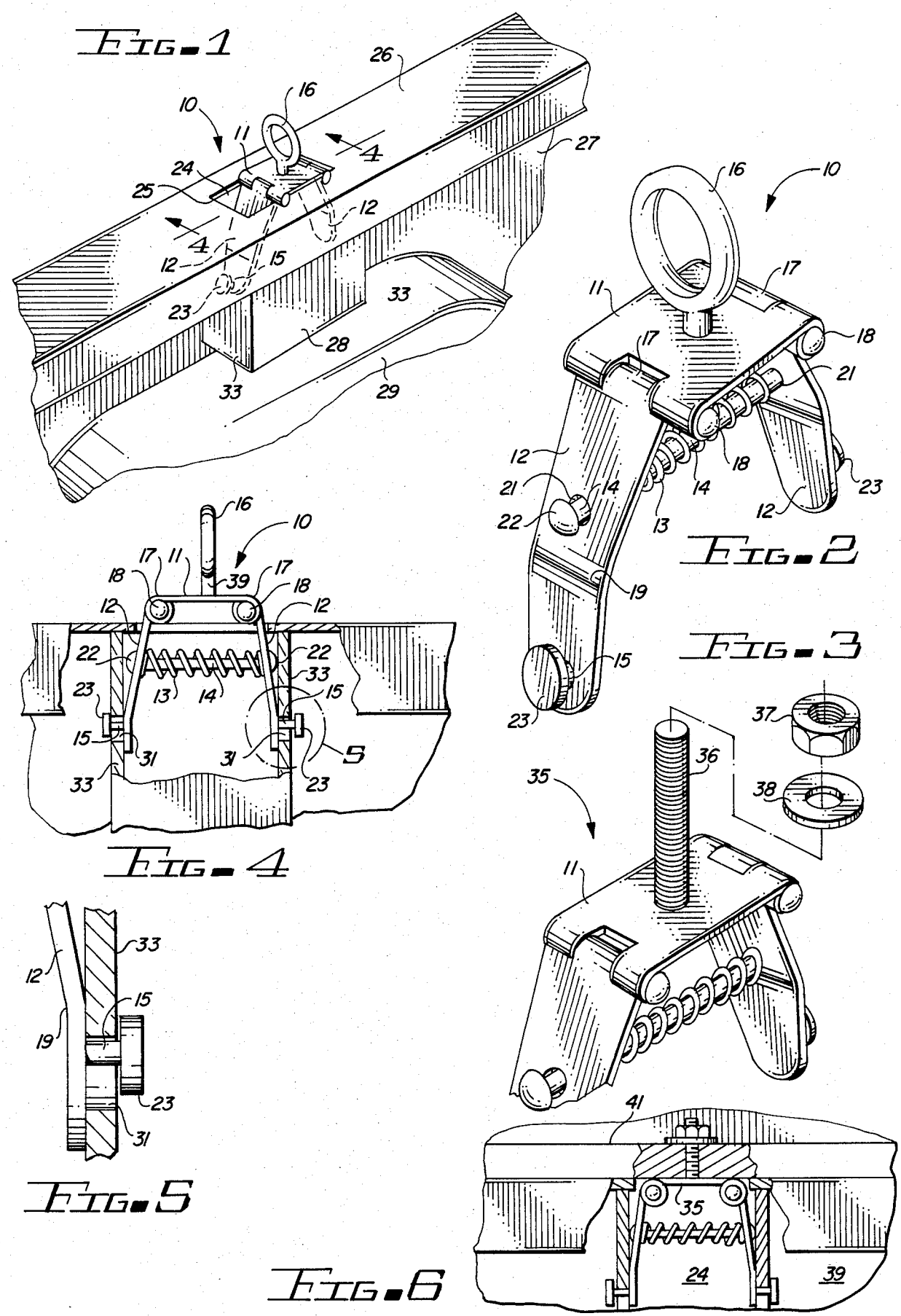

TIE-DOWN ANCHOR FOR TRUCK BED

BACKGROUND OF THE INVENTION

Tying down the cargo on an open truck bed such as on a modern pickup is not always a simple task. The difficulty is in finding an appropriate frame member or opening to which a rope or line can be secured.

Modern trucks and especially pickup trucks seem in some respects to be designed more for appearance than for utility. The metal cargo compartment is streamlined with no exposed frame members or openings with the exception of rectangular openings along the top edges of the box that are intended to receive the vertical support posts of a rack. Unless the owner is willing to drill holes in the truck bed and add permanent tie-down rings, he must typically resort to running the tie-down ropes to the underside of the truck where they can be secured to the chassis or to a frame support. In some cases the rack support openings may be utilized, but the sharp edges on these openings tend to cut and fray the tie-down rope; they are also not especially convenient for this purpose because of their location inside the walls of the truck bed where the load is often in the way and covering up the side opening through which the rope must pass.

Although the owner of the truck does have the option of adding permanent tie-down rings, he is ordinarily reluctant to do so because the projecting rings tend to interfere with other uses of the truck. They also detract from the appearance of the truck.

What is needed is a means for securing a rope or line to the truck bed, utilizing only the existing openings. The means provided for this purpose should be quickly and easily installed or removed so that it can be removed when not in use.

SUMMARY OF THE INVENTION

A self-attaching bracket with a tie-down ring is provided for use as an anchor for tie-down ropes employed to secure the load or cargo on an open truck bed.

It is, therefore, one object of this invention to provide an anchor to which tie-down ropes may be secured on an open truck bed.

Another object of the invention is to provide such an anchor in a form that may be easily and quickly installed and removed.

A further object of the invention is to provide such an anchor in a form that is installable in the existing openings commonly provided by the manufacturer of the truck for the mounting of a rack having vertical support posts.

A still further object of the invention is to provide such an anchor in a form that is substantially self-attaching whereby the anchor clamps itself securely into place without resorting to the use of additional screws, nuts or clips of any kind.

A still further object of the invention is to provide such an anchor in a simple and inexpensive form.

Yet another object of the invention is to provide as a second embodiment of the invention a similar anchor means that is adapted to permit certain types of loads to be bolted in place rather than tied down.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described with reference to the accompanying drawing, in which:

FIG. 1 is a perspective view showing the tie-down anchor of the invention installed in a rack support opening on the side rail of a truck bed;

FIG. 2 is an enlarged perspective view showing only the tie-down anchor of the invention;

FIG. 3 is a partial perspective view of a second embodiment of the invention in which the anchoring means is adapted for use in bolting down rather than tying down the load;

FIG. 4 is a cross-sectional view of the anchor of FIGS. 1 and 2 installed in the rack support opening as viewed along lines 4—4 of FIG. 1;

FIG. 5 is an enlarged cross-sectional view of the portion of the anchor shown enclosed in circle 5 of FIG. 4; and FIG. 6 is an illustration of the use of the anchor of FIG. 3 for the bolting in place of a load. Portions of the load and truck bed are shown cut away to reveal details of the anchor.

DESCRIPTION OF THE PREFERRED EMBODIMENT

Referring more particularly to the drawing by characters of reference, FIGS. 1, 2, 4 and 5 disclose a tie-down anchor 10 comprising a mounting platform 11, two spreading or pivoting arms 12, a spring 13 mounted between arms 12, a spring support rod 14, two latching studs 15 and a fastening means such as, for example, a tie-down ring 16.

Mounting platform 11 is a flat rectangular plate with provision at two opposite edges for the hinged or pivitol attachment of pivoting arms 12.

In a first implementation of the invention, arms 12 are attached at their upper ends by means of a hinge 17 utilizing hinge pins 18 of the type employed in an ordinary gate hinge. In this arrangement, the arms 12 extend downward from their hinged attachments at opposite edges of the horizontal platform 11.

Arms 12 are made of elongated sheet metal straps, tapered slightly toward their lower ends. A lateral bend 19 located approximately one-third the length of the arm from the lower end allows the lower end of arm 12 to assume an approximately vertical orientation substantially parallel with each other when the arms are spread apart as shown in FIG. 4.

Spring 13 is a compression type coil spring somewhat longer in its unstressed condition than the horizontal separation of the hinged attachments of the two arms 12.

Rod 14 passes through the center of spring 13, extending from both ends thereof through horizontally aligned holes 21 in the two arms 12.

Both ends of rod 14 are terminated in caps 22 after their passage through holes 21. Arms 12 are thus urged apart by spring 13, but they are retained by caps 22 so that their maximum separation is limited by the length of rod 14.

Studs 15 are fixedly attached to extend perpendicularly outward from the lower vertical portions of arms 12 a distance greater than the thickness of the side walls of the truck bed. Their outer extremities are terminated in a head 23 resembling the head of a large nail or spike the under surface of which defines a plane surface which engages a surface of a cavity of the side wall of the truck bed when in use.

Anchor 10 is designed to be installed in and attached within one of the cavities 24 typically provided in the tops of the side walls of a pickup bed or about the periphery of the flat bed of a larger truck. The cavities 24 are intended for use in the mounting of a cattle rack to the truck bed, in which case the cavities receive vertical posts that extend downwardly from the rack.

Cavity 24 comprises a rectangular opening 25 in the top surface 26 of the rail or side wall 27 of a truck bed. Directly below opening 25 and aligned therewith is a box-like compartment 28 that ordinarily receives the lower end of the vertical post of the rack. FIG. 1 shows such a cavity 24 and associated compartment 28 located over a wheel well 29. Horizontally aligned bolt holes 31 are typically provided by the truck manufacturer in the opposite faces 33 of compartment 28, the holes 31 being intended to receive a bolt which also passes through the end of the rack support post.

To install anchor 10 in cavity 24, arms 12 are first pressed inwardly against the action of spring 13. With the arms retracted, the lower ends of arms 12 are passed downward through opening 25. As studs 15 enter cavity 24 below opening 25, arms 12 are allowed to spread apart under the action of spring 13 so that heads 23 of studs 15 bear against the inside surfaces of walls 33. The position of the anchor inside cavity 24 is then adjusted until studs 15 find their way into holes 31. Once this has occurred, the outward pressure of spring 13 against arms 12 causes studs 15 to remain locked in place inside holes 31. Anchor 10 is thus effectively latched in place within cavity 24.

Ring 16 which is secured by means of a post 39 to mounting platform 11 extends vertically upwardly therefrom and is thus conveniently positioned to receive a rope or line employed to tie down the cargo that is loaded on or in the bed of the truck. If the truck bed is jolted by a rough spot in the road the lines or ropes secured to ring 16 tend to jerk at anchor 10. Under these conditions, the heads 23 of the fastening means aid in preventing studs 15 from becoming dislodged from their positions inside holes 31.

Certain types of loads or accessories commonly mounted on truck beds are intended to be bolted in place rather than tied down. An example of this is the popular camper shell that is frequently mounted on the back of a pickup truck.

The bolt-down anchor 35 shown in FIGS. 3 and 6 is intended for such use. Anchor 35 is identical to anchor 10, except that ring 16 is replaced by a threaded stud 36 that extends vertically upwardly and outwardly from platform 11. Stud 36 is intended to be passed through mounting holes in the accessory which is to be secured to the truck bed. The accessory is then clamped in place by means of nut 37 and washer 38 which are applied over the threaded stud 36.

FIG. 6 shows anchor 35 latched into a cavity 24 of a truck 39 and securing in position an accessory such as a camper shell 41.

It will be recognized that numerous variations in construction of the anchors 10 and 35 are possible. A one-piece molded plastic version, for example, could be provided at very low cost, with nylon or teflon being employed to provide the necessary strength.

Although but a few embodiments of the invention have been illustrated and described, it will be apparent to those skilled in the art that various other changes and modifications may be made therein without departing from the spirit of the invention or from the scope of the appended claims.

What is claimed is:

1. A tie-down anchor for mounting in an opening in the top surface of a side wall of a truck bed comprising:
   a mounting platform having a top surface,
   a pair of elongated arms, one pivotally mounted at each end of said platform,
   spring means mounted to extend between said arms to pivotally urge them away from each other,
   said spring means comprising a rod slidably extending between and through an opening in each of said arms, and a compression type coil spring mounted around said rod between said arms,
   each end of said rod having a cap thereon for limiting the movement of said arms away from each other under the bracing effect of said spring,
   said arms being bent along their lengths so that end portions thereof extending substantially parallel to each other when the arms are in their extended positions under the influence of said spring means,
   a pair of latching studs, one mounted on the end portion of each of said arms for extending through holes in the side walls of the truck bed to secure the anchor to the truck bed when the arms are extended under the influence of said spring means,
   said pair of latching studs each comprising a stud extending outwardly of the outside surface of the associated arm a distance greater than the thickness of the side wall of the truck bed and having a head at the end thereof the under surface of which defines a plane surface which engages the outside surface of the side walls of the opening in the truck bed when in use, and
   fastening means mounted on top surface of said platform to extend upwardly therefrom.

2. The tie-down anchor set forth in claim 1 wherein: said fastening means comprises a tie-down ring secured to the top surface of said platform.

3. The tie-down anchor set forth in claim 1 wherein: said fastening means comprises a threaded stud.

* * * * *